(No Model.)
P. HARVEY.
WATER CLOSET AND TANK.
No. 530,306. Patented Dec. 4, 1894.
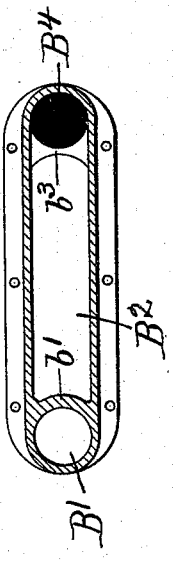
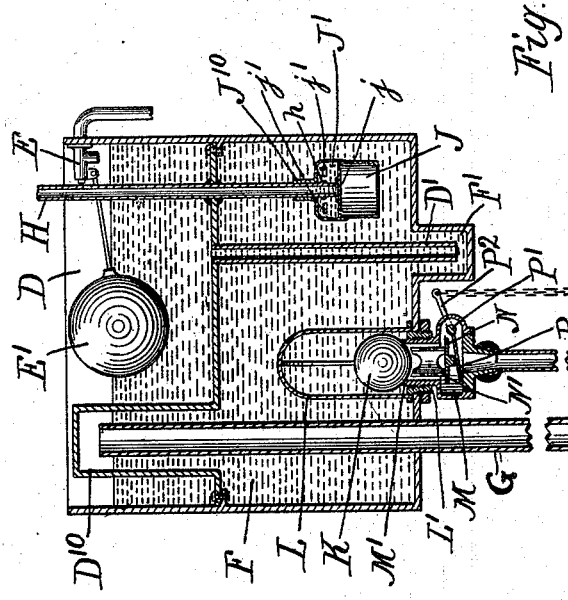
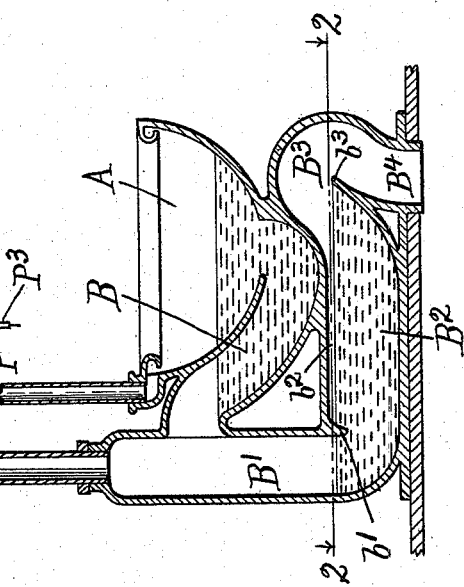
Witnesses.
E. T. Wraf.
Jean Elliott
Inventor.
Patrick Harvey
by Burton and Burton
his attys

UNITED STATES PATENT OFFICE.

PATRICK HARVEY, OF CHICAGO, ILLINOIS.

WATER-CLOSET AND TANK.

SPECIFICATION forming part of Letters Patent No. 530,306, dated December 4, 1894.

Application filed April 18, 1894. Serial No. 507,955. (No model.)

*To all whom it may concern:*

Be it known that I, PATRICK HARVEY, a citizen of the United States, residing at Chicago, county of Cook, and State of Illinois, have invented certain new and useful Improvements in Water-Closets and Tanks, which are fully set forth in the following specification, reference being had to the accompanying drawings, forming a part thereof.

In the drawings,—Figure 1 is a vertical section through my improved tank and through the closet bowl and discharge pipes. Fig. 2 is a section at the line 2—2 on Fig. 1.

A is the bowl; B, the up-limb of the siphonic discharge passage constituting the upper trap, and B', the inter-trap space and the down-limb of said siphon; $B^2$, an elongated horizontal passage or chamber constituting the lower trap and commencement of the up-limb of the final siphon, of which $B^3$ is the crest, and $B^4$, the down-limb.

$b'$ is the dip or depending bridge of the lower trap; $b^3$, the bridge proper of said trap. The crest or highest point of the bridge $B^3$ is lower than the upper wall of the horizontal chamber $B^2$ of the lower trap, so that when the trap is full to the top of said bridge, a space $b^2$ remains above the water in the chamber $B^2$. Considering, therefore, the entire lower trap of which the receiving branch is the down-limb B' of the upper siphon, it will be observed that the water surface in that receiving limb is only a small fraction of the water surface in the other limb, which is the horizontal elongated chamber $B^2$. Two important results are attained by this construction:—First,—when the suction induced by the tank devices of whatever nature partially exhausts air from the inter-trap space B', the water-level in the branch $B^2$ of the lower trap, falling any distance less than the amount of the dip of the trap,—that is, any distance less than sufficient to draw air back past the dip into the inter-trap space B',—will cause the water level in the limb B' to rise as many times the distance which it falls in the other limb as the area in the other limb is greater than the area of the water surface in the limb B', so that if, for example, the dip of the trap be half an inch, the area of the water surface in $B^2$, being approximately five times the cross areas of the limb B', the water will rise in B' two inches and a half before the water seal will be broken. Also, from the same construction, it results that although on account of the shallow dip of the trap, requiring only a slight lift to carry solid substance out through it, the flushing of the bowl and passages can be effected by a much less violent flow of water, yet, in case of back pressure of gas from the sewer, such pressure exerted upon the extended water surface in the limb $B^2$ of the lower trap, will raise the water in the limb B' five times as much as it is depressed in $B^2$, so that no gas will escape past the trap until the pressure is equal to a column of water five times the dip of the trap. There is thus obtained all the benefit of a deep water seal, as respects prevention of escape of sewer gas past the trap, and all the benefit of a shallow trap as respects ease and certainty of evacuating the passages in flushing.

Co-operating with the closet bowl having the passages described, I employ the flushing tank illustrated, wherein are two chambers; D, into which the supply valve E discharges, and F, into which the water passes from the chamber D through the pipe D', which terminates in the pocket F' at the bottom of the chamber F, and constituting a trap about the discharge mouth of said pipe D'. At the upper part of the chamber F is an annex or hood $D^{10}$, extending up into the chamber D, but entirely closed with respect to that chamber, and into this annex or hood the air-exhaust pipe G protrudes, extending up from the closet through the bottom of the chamber F, and opening at the upper end within the hood or annex $D^{10}$, the level of its upper opening being the overflow level of the tank, as will appear when the operation of the structure is considered.

H is a vent pipe, which extends through the bottom of the chamber D, being opened at the lower end in the chamber F, and at the upper end above the overflow level of the chamber D. At its lower end, it dips in a pocket, which, as illustrated, but not of necessity for all purposes, is formed upon the upper end of a float J. The pocket J' has ports $j'$ for the ingress and escape of water, whose distance from the bottom determines the depth of the latter available as a water seal, as hereinafter explained. The purpose of combining this pocket with a float, is that, when submerged to a certain degree, it may be lifted against the lower end of the pipe H, and operate as a valve to close it at that end. It is therefore adapted to have a certain limited play in the pipe H, and, for that purpose, is provided with a neck or collar $J^{10}$, and the pipe H is provided with a flange or shoulder $h$, on which the neck or collar lodges and by which the float and pocket are suspended on the pipe which determines the lower limit of the movement of the float, the upper limit being determined by the seating of the valve surface $j$ up against the lower end of the pipe H.

The character of the flushing valve is not vitally material to the operation of the closet, but I prefer, and have shown for that purpose, a float valve K, retained in a cage L, extending up to some distance above the valve seat. Such seat is formed upon the upper margin of the tubular terminal M' of the chamber fitting M, which is screwed up through the bottom of the tank from beneath, the collar L', which supports the cage L, and which is secured in a suitable opening made in the bottom of the tank, being interiorly threaded to permit this mode of attaching the chamber M.

N is a flat valve which seats upwardly against the lower end of the tube M' within the chamber fitting M, and which has a tubular extension N', projecting from its upper surface and guided within the tubular terminal M', and adapted, when the valve is pushed upward, to lift the float valve K from its seat. The tubular projection N' is notched at its upper edge, so that the float does not find perfect seating upon it, but is lifted by it, so that free access is given to the water under the float valve and into the port M'. The tubular extension N' is also apertured at the lower end above the valve N, so that the water which enters past the float is not retained but may escape past the valve N, when the latter is off its seat.

In the chamber fitting M, below the valve N, a lever P is provided on a rock shaft P', which extends out through the sides of the fitting, and outside of the latter has a lever arm $P^2$, to which a pull rod or chain $P^3$ is connected by which the device may be operated.

The operation of the entire tank, in connection with the closet, is as follows: When the chain $P^3$ is pulled down, the lever P is pushed up, and pushes up the valve N to its seat lifting the float valve from its seat, whereupon said float immediately rises to the top of the cage L. The operator releasing the pull chain $P^3$, permits the valve N to fall from its seat, and free passage is thus opened for the water from the chamber D through the flushing pipe to the bowl. As the water falls in the chamber F, air is drawn up through the pipe G by reason of a partial vacuum produced first in the annex or hood $D^{10}$, and subsequently, as the water falls still lower, in the body of the chamber F. This induces siphonic action of the closet in the manner well understood. When the water level has fallen so low that the float J is no longer buoyed with sufficient force to hold it against the lower end of the pipe H, it drops away from that pipe, the collar $J^{10}$ lodging on the shoulder $h$, leaving, however, the end of the pipe still dipping slightly in the water in the pocket J', but the suction due to the partial vacuum in the chamber F, overcomes the slight water seal, and air enters immediately through the pipe H, thus breaking a partial vacuum and terminating the siphonic action of the closet, so that the bowl A refills to the level of the bridge of the upper trap, and the remainder of the water in the tank, flowing out through the flushing pipe, constitutes the re-fill for the closet, such flow continuing until the float valve K, falling in the water, becomes lodged again upon its seat. The amount of the refilling is thus determined by the height at which the float J is located in the tank. The tank will be refilled by the usual operation of the ball cock, which has been opened by the falling of its float E' as the water level fell in the chamber D.

It will be noticed that this closet and tank can be operated without regard to the continuity of the water-supply through the valve E, and that the action is perfect in all respects, even though there be no new supply after the tank has emptied itself in effecting one complete flushing and refill of the closet, so that the tank, being filled by any means, will perform its function perfectly; and that the air passage will all be left water sealed after each use, even though the tank be not refilled until the next instance of use, for after the water has fallen and seated the float valve K, the end of the pipe H is still left dipping in the end of the pocket J' and water-sealed at that point. The pipe D' dips in the pocket F', and is water-sealed at that point. Back pressure from the sewer cannot pass the trap $B^2$ until it has overcome a water column several times the dip of the trap, and it should be noticed also that the character of the trap formed at the lower end of the pipe H, has the same characteristic as pertains to the lower trap closet,—viz: that the water surface upon which any back pressure of gas tending to force its way out through the pipe H into the room would be experienced, is several times the area of the water surface in the other limb,—to-wit: the cross section of the pipe H,—so that such back pressure will raise a column in the pipe H several times the depth of the water seal in the pocket J' before it can pass that seal. The ratio between the two surfaces can be made almost anything that may be desired, the pipe H having no function except as an air vent, being entirely efficient if it is very small, and the area of the pocket being limited only by the space available in the tank, since whatever its area and consequent weight, the size of the float underneath it may correspond to it and buoy it.

An important reason for providing the float to uphold the pan which affords the pocket for the water-seal at the end of the pipe H, may be understood by considering what the action would be if the pan were fixed at the position to which it falls in such case, after the water in the tank has fallen past the ports of the pan or pocket. The air would pass the water seal in bubbles, producing an unpleasant gurgling noise which would continue for a considerable time while the water continued to fall in the tank. When the pan is provided with the float by which it is held up against the end of the pipe, the pipe is by this means kept closed, so that no air passes until the water has fallen to a point somewhat below the top of the float,—that is to say,—to such point that the float is no longer sufficiently submerged to be held up against the pipe. The float at this point commencing to descend away from the mouth of the pipe permits the air to pass into the tank through the vent-pipe H through only the shallow water seal contained in the pan itself, and that water seal is rapidly diminishing by the continuing descent of the float, so that practically, instead of the air entering in loud-sounding bubbles through a considerable depth of water, as would be the case without the float, it enters the latter through the very shallow seal which is provided in the pan and with almost imperceptible sound. For a similar reason, the shallow seal in the lower trap of the closet is preferable to a deeper seal,—viz: that the forcing back of the air from the inter-trap space and the air-pipe, which occurs while the tank is filling, is not accompanied with the unpleasant gurgling which occurs when the air must enter through a deep seal, the only advantage of which is the greater protection which it affords against back pressure, which, as above explained, is equally afforded by the structure herein shown.

I claim—

1. In a closet tank, in combination with an open water chamber, a closed chamber receiving the water from the first through the trap passage, and having an annex extending higher than the water level of the open chamber; the water closet bowl having two traps constituting a siphonic discharge passage; a pipe leading from the inter-trap space into the annex of the closed chamber of the tank and opening therein above the water level; an air vent pipe leading from the closed tank at a point therein above the discharge port, and a pocket into which the lower end of said air vent pipe dips to constitute a water seal therefor, the water surface of the pocket outside the pipe being several times the cross-areas of the pipe: substantially as and for the purpose set forth.

2. In combination with the open chamber and the closed chamber receiving water therefrom and having an annex extending above the water level of the open chamber, and the air exhaust pipe from the closet leading into said annex above said water level; the vent pipe H terminating in the closed chamber above the discharge port thereof, and the pocket J' in which said pipe opens connected to said pipe at the lower end and having a short range of vertical movement with respect thereto; and the float J connected to such pocket tending to uphold it against the end of the pipe to close the same when the float is submerged, and adapted to permit it to drop away from the pipe and constitute a trap thereabout when the water ceases to uphold the float: substantially as set forth.

In testimony whereof I have hereunto set my hand, in the presence of two witnesses, at Chicago, Illinois, this 13th day of April, 1894.

PATRICK HARVEY.

Witnesses:
CHAS. S. BURTON,
JEAN ELLIOTT.